(12) United States Patent
Lamoureux et al.

(10) Patent No.: US 12,466,243 B2
(45) Date of Patent: Nov. 11, 2025

(54) GLAZED UNIT WITH TWO GLASS PANES AND A SEAL FOR ASSEMBLING SAID GLASS PANES

(71) Applicant: SAINT-GOBAIN GLASS FRANCE, Courbevoie (FR)

(72) Inventors: Laurent Lamoureux, Ribecourt-Dreslincourt (FR); Frédéric Berthe, Cambronne les Ribecourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 231 days.

(21) Appl. No.: 18/552,035

(22) PCT Filed: Mar. 23, 2022

(86) PCT No.: PCT/FR2022/050537
§ 371 (c)(1),
(2) Date: Sep. 22, 2023

(87) PCT Pub. No.: WO2022/200734
PCT Pub. Date: Sep. 29, 2022

(65) Prior Publication Data
US 2024/0174057 A1 May 30, 2024

(30) Foreign Application Priority Data
Mar. 25, 2021 (FR) ...................... 2103024

(51) Int. Cl.
*B60J 1/00* (2006.01)
*B32B 17/10* (2006.01)
*B60J 1/06* (2006.01)

(52) U.S. Cl.
CPC ......... *B60J 1/008* (2013.01); *B32B 17/10036* (2013.01); *B32B 17/10293* (2013.01); *B32B 17/10302* (2013.01); *B60J 1/06* (2013.01)

(58) Field of Classification Search
CPC ..... B60J 1/06; B60J 1/001; B60J 10/34; B60J 10/36; B60J 10/365; B60J 10/70;
(Continued)

(56) References Cited

U.S. PATENT DOCUMENTS 5,060,440 A    10/1991   Weaver

FOREIGN PATENT DOCUMENTS

CN        109070715 A  * 12/2018  ............. B60J 1/001
WO     WO 2006/064153 A1    6/2006
(Continued)

OTHER PUBLICATIONS

Translation of CN109070715A. (Year: 2018).*
International Search Report as issued in International Patent Application No. PCT/FR2022/050537, dated Jul. 8, 2022.

*Primary Examiner* — Catherine A. Simone
(74) *Attorney, Agent, or Firm* — Pillsbury Winthrop Shaw Pittman LLP

(57) ABSTRACT

A glazed unit in particular for a vehicle of transport, includes a first glass pane and a second glass pane that are contiguous, the second glass pane being laminated and includes an exterior glass sheet, an interior glass sheet and a plastic material interlayer arranged between the exterior glass sheet and the interior glass sheet, the glazed unit having an exterior face and an interior face, wherein the glazed unit includes a seal arranged between the first glass pane and the second glass pane, having an exterior face and an interior face, the exterior face of the glazed unit and the exterior face of the seal being flush with one another and the seal being in contact with an interior face of the exterior glass sheet of the second glass pane.

17 Claims, 4 Drawing Sheets

(58) Field of Classification Search
CPC .......... B32B 17/10036; B32B 17/1055; B32B 17/10559; B32B 17/10293; B32B 17/10302; E06B 3/56; E06B 3/5436; E06B 3/5427; E06B 3/5814; E06B 3/677; E06B 3/6775
See application file for complete search history.

(56) References Cited

FOREIGN PATENT DOCUMENTS

WO     WO 2018/178574 A1    10/2018
WO     WO 2021/009356 A1     1/2021

* cited by examiner

[Fig.1]
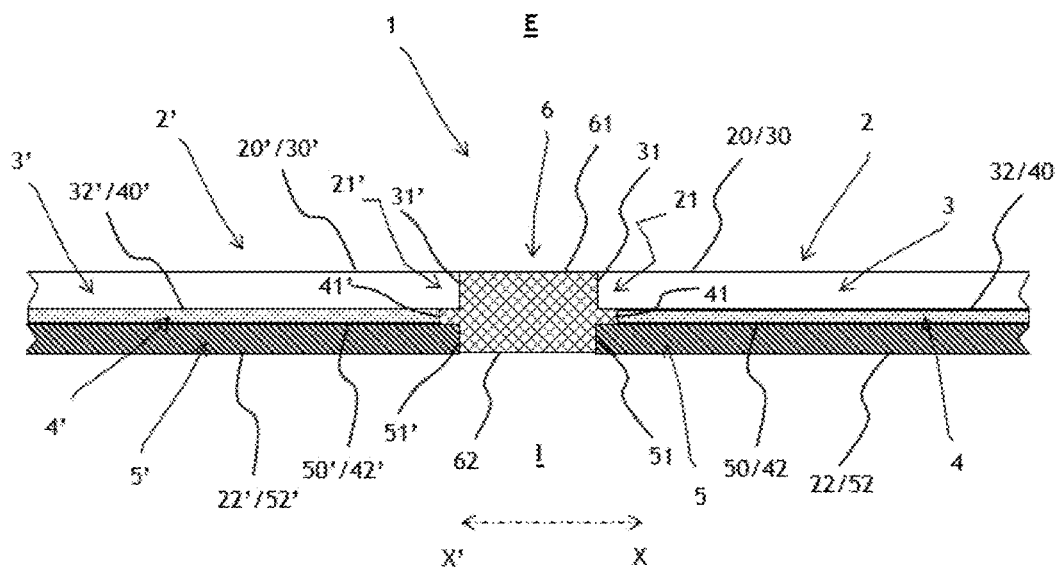
[Fig.2]
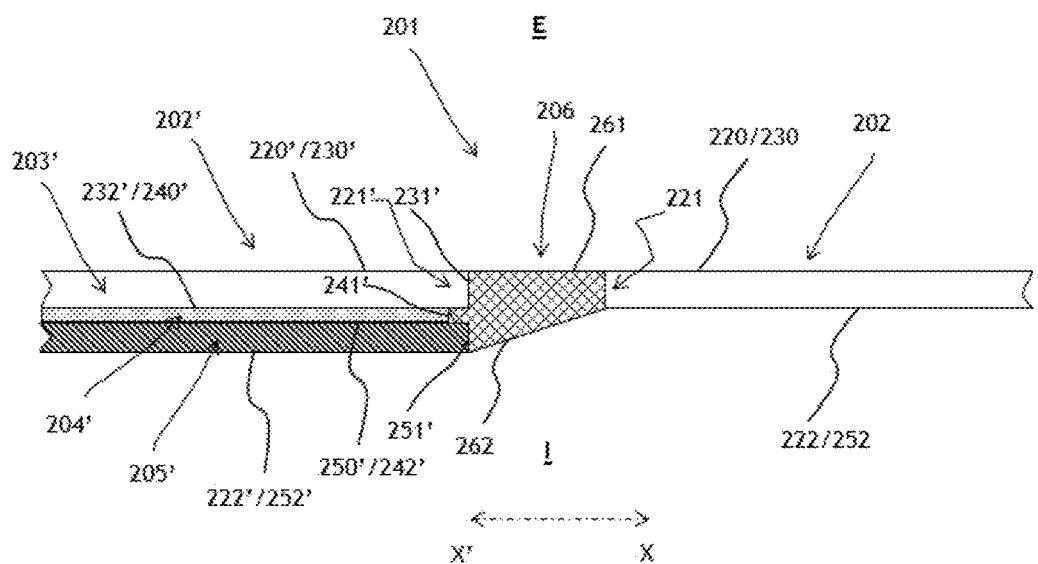

[Fig.3]
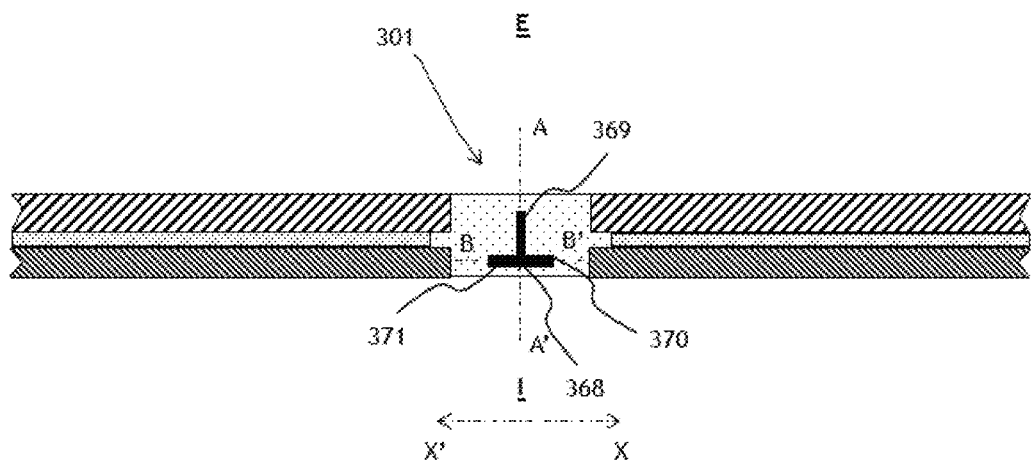
[Fig.4]
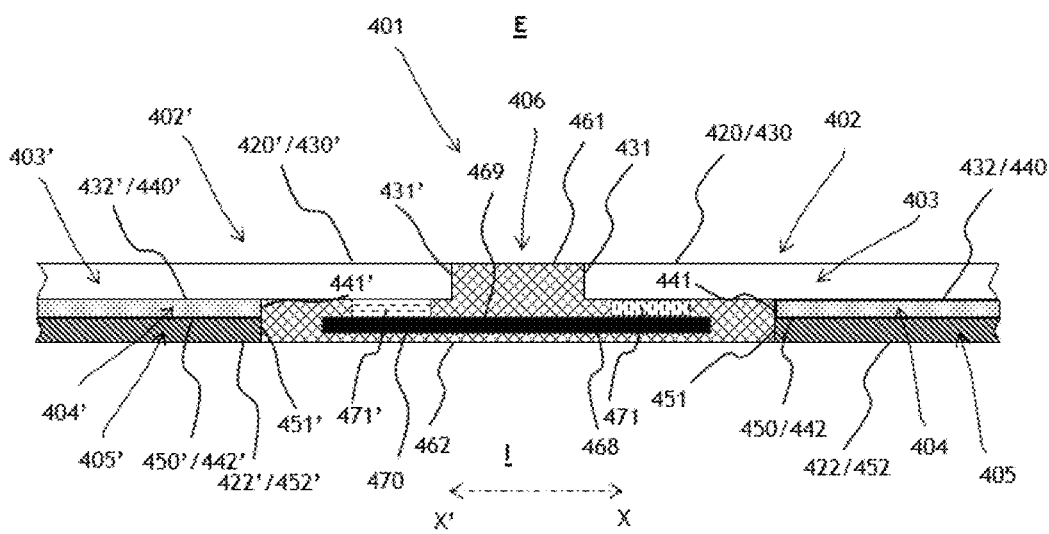
[Fig.5]
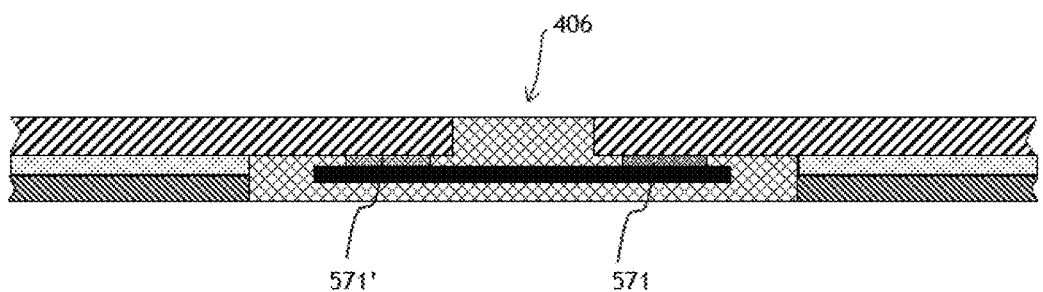

[Fig.6]
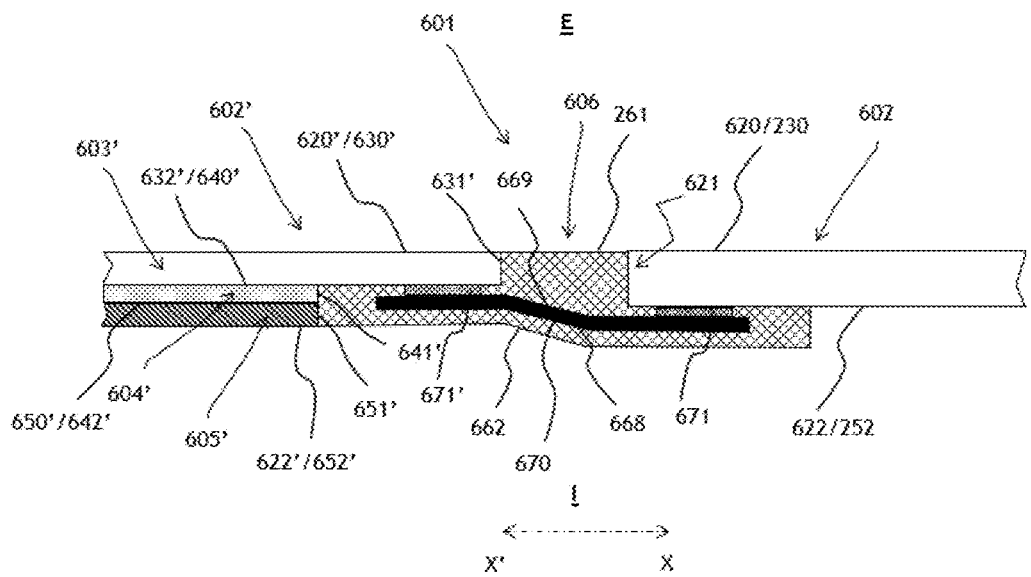
[Fig.7]
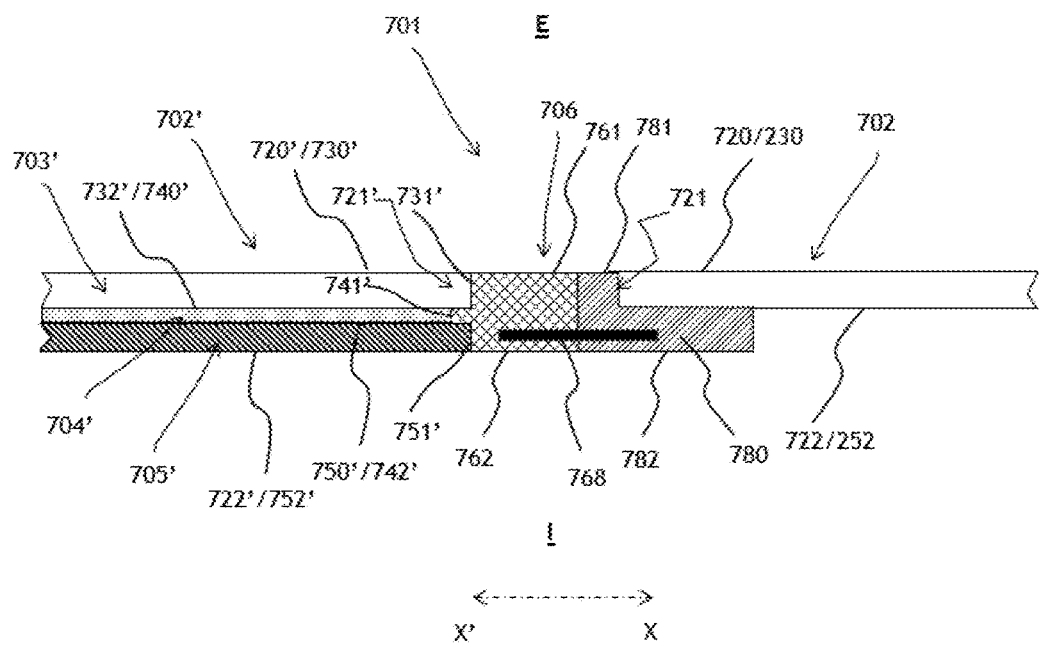

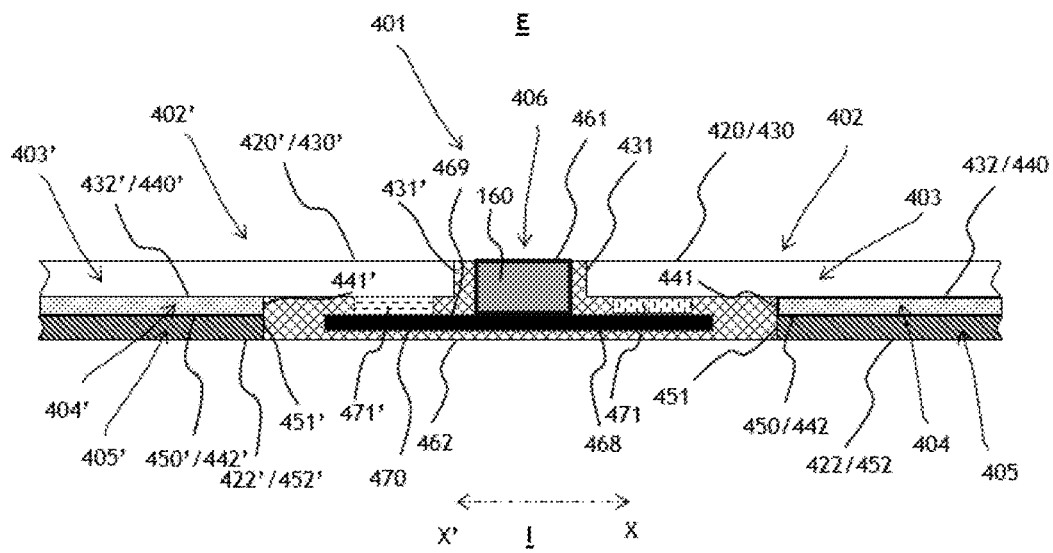
[Fig.8]
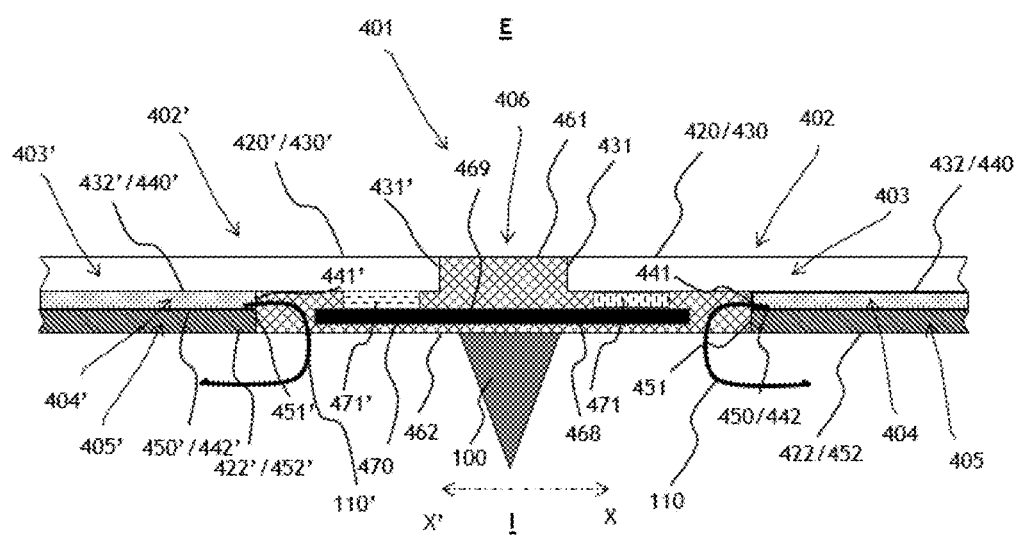
[Fig.9]

GLAZED UNIT WITH TWO GLASS PANES AND A SEAL FOR ASSEMBLING SAID GLASS PANES

CROSS-REFERENCE TO RELATED APPLICATIONS

This application is the U.S. National Stage of PCT/FR2022/050537, filed Mar. 23, 2022, which in turn claims priority to French patent application number 2103024 filed Mar. 25, 2021. The content of these applications are incorporated herein by reference in their entireties.

The invention relates to a glazed unit for means of transport, in particular a vehicle, and in particular a motor vehicle, including two contiguous glass panes and a seal, at least one of the glass panes being laminated.

Known from the prior art are glazed units including a first glass pane and a second glass pane assembled side by side in order to form only one glazed unit. Such an assembly is of interest when it is desired to obtain a glazed unit of complex shape. It may, for example, be a glazed unit for a motor vehicle having significant bending along a first axis of curvature and very low bending along a second axis, perpendicular to the first. Such a glazed unit includes for example both the windshield and a panoramic roof glass pane of the vehicle, or both the windshield and fixed front side glass panes of the vehicle, or even both a roof glass pane and a fixed rear glass pane of the vehicle. Bending methods implemented in the glass industry make it possible to obtain a single-piece glazed unit having relatively low bending. For glazed units having relatively high bending, it is preferable to assemble a first glass pane and a second glass pane by means of an assembly device in order to simplify production thereof.

Solutions that juxtapose glass panes are known in the prior art, and in particular for vehicles, where a first glass pane and a second glass pane juxtaposed or contiguous to the first are assembled side by side owing to an assembly system.

International patent application No. WO 2006/064153 discloses an assembly system wherein a rigid profile portion is attached to a first glass pane and has a projecting part to support the second glass element. In practice, this profile is difficult to implement due to its rigidity and can only be suitable when the adjacent edges of the glass panes are completely rectilinear.

International patent application No. WO 2018/178574 discloses another solution for such a glazed unit with a first glass pane and a second glass pane assembled side by side. It includes two contiguous glass panes and two profiled seal bodies arranged face to face and each located in contact with a part of the edge surface of one of said glass panes. The glazed unit further includes one, or even two, flexible exterior covering(s) having an exterior face arranged in continuity with an exterior face of the glass pane. Thus, the glazed unit includes a flush join on its exterior face, consequently improving its aesthetic. The disadvantage of the configuration described in this document is that the interior face of the glazed unit has an unsightly protuberance due to the assembly means implemented. Furthermore, the assembly requires restrictive bonding operations that may cause sealing problems.

International patent application No. WO 2021/09356 discloses a glazed unit including a first glass pane and a second glass pane that are contiguous with a simple seal between the glass panes. The mechanical strength of this glazed unit could be improved.

One aim of the invention is to overcome the disadvantages of the prior art by proposing a glazed unit including two glass panes that are simple to assemble with one another and having improved aesthetics while having a high mechanical strength.

The present invention is particularly suitable when the facing edges of the glass panes are curved.

To do this, the present invention thus relates, in its broadest sense, to a glazed unit for a means of transportation, in particular for a vehicle, according to claim 1.

This glazed unit comprises a first glass pane and a second glass pane that are contiguous, the second glass pane being laminated and includes an exterior glass sheet, an interior glass sheet and a plastic material interlayer arranged between said exterior glass sheet and said interior glass sheet, said glazed unit having an exterior face and an interior face, an edge surface of the interlayer of said second glass pane being set back relative to an edge surface of the exterior glass sheet of said second glass pane.

Said glazed unit includes a seal arranged between said first glass pane and said second glass pane by adhering to an edge surface of said exterior glass sheet of the second glass pane and an edge surface of said first glass pane and having an exterior face and an interior face, the exterior face of said glazed unit and the exterior face of said seal being flush.

Said seal is in contact with an interior face of the exterior glass sheet of said second glass pane.

For the purposes of the present invention, "flush" should be understood as meaning that at the junction between the first glass pane and the second glass pane, viewed in cross section, from the exterior space, there is no glazed unit element, and in particular no element of the seal, farther toward the exterior than a flush line joining the exterior face of the first glass pane and the exterior face of the second glass pane.

In some variants, at the junction between the first glass pane and the second glass pane, viewed in cross section, from the interior space, there is no glazed unit element, and in particular no element of the seal, farther toward the interior than a flush line joining the interior face of the first glass pane and the interior face of the second glass pane.

The, or each, flush line is straight or curved; it is continuous with the curvature of each face while meeting in the middle of the inter-glass pane space.

Thus, said seal has an exterior face which forms the junction between an exterior rim of said first glass pane and an exterior rim of said second glass pane and furthermore, in certain variants, said seal has an interior face which forms the junction between an interior rim of said first glass pane and an interior rim of said second glass pane. The glazed unit is thus designed such that in the installed state, in the vehicle, no bodywork upright nor any masking element is installed facing the exterior face of said seal and farther toward the exterior, nor, in certain variants, facing the interior face of said seal and farther toward the interior.

The exterior face of said seal and, in certain variants, the interior face of said seal can be called "free" because they are visible respectively from a space exterior to the vehicle and from an interior space of the vehicle. This freedom of the exterior and interior faces of said seal is an item of data provided from the design of the glazed unit; it is visible on the design plan of the vehicle and on the design plan of the vehicle glazed unit.

In certain other variants, the glazed unit includes a single bead of adhesive under the interior face of said seal. This bead of adhesive is visible on the design plan of the vehicle and on the design plan of the vehicle glazed unit. It serves to bond the glazed unit in a single strip along a bodywork upright or along an interior cover.

This seal is a simple connecting seal, ensuring sealing between the facing edge surfaces of the first and second glass panes; this is not a rigid profiled element, as in international patent application No. WO 2006/064153; it is simpler to design, simpler to implement, and in particular can be curved along its length (facing the length of the edge surfaces of the first glass pane and the second glass pane).

Said seal is preferably made of a single material between its exterior face and its interior face; this material may be multi-component in the sense that its chemical analysis can reveal the presence of several chemical components; however, the material analysis of the seal leads to considering that it is made of a single material.

Preferably, said seal includes an insert, this insert being made of a different material, and preferably of a material with a Young's modulus which is higher than the material of the seal.

Advantageously, said insert is made of a metallic or plastic material, preferably reinforced by fibers and in particular glass or carbon fibers.

In a variant, said insert is T-shaped, with the trunk of the T located between the first glass pane and the second glass pane.

Preferably, when the glazed unit includes a single bead of adhesive and an insert, this bead of adhesive is located facing the insert in order to increase the mechanical strength.

Preferably, the interior face of said glazed unit and the interior face of said seal are flush.

Preferably, said first glass pane is laminated and includes an exterior glass sheet, an interior glass sheet and a plastic material interlayer arranged between said exterior glass sheet and said interior glass sheet; said exterior glass sheet of said first glass pane has an interlayer face, said exterior glass sheet of said second glass pane has an interlayer face.

Said seal is preferably in contact with an interior face of the exterior glass sheet of said first laminated glass pane.

Said insert preferably has a face arranged facing an interlayer face of the exterior glass sheet of said laminated second glass pane, and preferably further facing an interlayer face of the exterior glass sheet of said laminated first glass pane.

Preferably, said glazed unit includes at least one adhesion means arranged between said face of said insert and said interlayer faces.

Preferably, said adhesion means includes a double-sided adhesive or a polymer, such as polyurethane.

Preferably, said first glass pane is monolithic and has an interior face and said exterior glass sheet of said second glass pane has an interlayer face, said insert having a face arranged facing said interior face of the first glass pane and said interlayer face of said second glass pane.

Preferably, said first glass pane is monolithic and includes an encapsulated seal comprising said insert.

When a glass pane is laminated, the outermost layer and the innermost layer are preferably made of glass; when a glass pane is monolithic, it may be made of glass or plastic, such as, for example, made of or based on polycarbonate.

The glazed unit according to the invention can allow production of both the windshield and a panoramic roof glass pane of a vehicle, or both the windshield and fixed front side glass panes of a vehicle, or even both a roof glass pane and a fixed rear glass pane of a vehicle, or even the combinations of these possibilities.

Described below, by way of non-limiting examples, will be several embodiments of the present invention referring to the appended figures in which:

FIG. 1 schematically shows a cross sectional view of a glazed unit including a first laminated glass pane and a second laminated glass pane, according to a first embodiment of the invention;

FIG. 2 schematically shows a cross sectional view of a glazed unit including a first monolithic glass pane and a second laminated glass pane, according to a second embodiment of the invention;

FIG. 3 schematically shows a cross sectional view of a glazed unit including a first laminated glass pane, a second laminated glass pane and an insert, according to a third embodiment of the invention;

FIG. 4 schematically shows a cross sectional view of a glazed unit including a first laminated glass pane, a second laminated glass pane and an insert, according to a fourth embodiment of the invention;

FIG. 5 schematically shows a cross sectional view of a glazed unit including a first laminated glass pane, a second laminated glass pane and an insert, according to a fifth embodiment of the invention;

FIG. 6 schematically shows a cross sectional view of a glazed unit including a first monolithic glass pane, a second laminated glass pane and an insert, according to a sixth embodiment of the invention;

FIG. 7 schematically shows a cross sectional view of a glazed unit including a first monolithic glass pane, a second laminated glass pane and an insert, according to a seventh embodiment of the invention;

FIG. 8 schematically shows a cross sectional view of the fourth embodiment of the invention with an insert with a mechanical connection system; and FIG. 9 schematically shows a cross sectional view of the fourth embodiment of the invention with a single bead of adhesive.

The present invention is described by way of example in the context of an application as vehicle glazed unit. This glazed unit closes a glass pane opening by forming a separation between an exterior space E, which is outside the vehicle, and an interior space I, which is inside the vehicle. The ideas of "exterior" and "interior" are therefore considered relative, respectively, to the exterior space E and the interior space I.

The present invention is described, by way of non-limiting example, by being applied to a windshield glazed unit and a vehicle panoramic roof, and in particular of a motor vehicle. Thus, in the illustrative figures, the glazed unit is shown schematically, in vertical cross sectional views, in the state installed in a bodywork opening (not visible). The glazed unit includes two glass panes arranged side by side or, more precisely, one in front of the other when the direction of advance of the vehicle is considered.

In the context of the present document, FIGS. 1 to 7 show the central longitudinal axis of advance of the vehicle equipped with the glazed unit according to the invention as windshield and roof glazed unit, generally called the axis X-X' of the vehicle.

Referring to FIG. 1, schematically shown in vertical cross section is a glazed unit 1 comprising a first glass pane 2 and a second glass pane 2', according to a first embodiment of the present invention. Each glass pane 2, 2' thus has an exterior face 20, 20' oriented toward the exterior space E, an interior face 22, 22' oriented toward the interior space I and a peripheral edge surface 21, 21' located between these two faces. Each of the two glass panes 2, 2' of the glazed unit 1 is preferentially a laminated glass pane that includes, from the exterior toward the interior, at least: an exterior glass sheet 3, 3', a plastic material interlayer 4, 4' and an interior glass sheet 5, 5'; however, it is possible for at least one other sheet to be interleaved between the exterior glass sheet 3, 3' and the plastic material interlayer 4, 4' or between the plastic material interlayer 4, 4' and the interior glass sheet 5, 5'. Straight edge surfaces 21, 21' are shown. Alternatively, the edge surfaces 21, 21' are rounded. Each exterior glass sheet 3, 3' has an exterior face 30, 30' oriented toward the exterior space E and thus corresponding to the exterior face 20, 20' of the glass pane 2, 2', an interlayer face 32, 32' which is oriented toward the plastic material interlayer 4, 4', and an edge surface 31, 31' located between these two faces.

Each interior glass sheet 5, 5' has an interlayer face 50, 50' which is oriented toward the plastic material interlayer 4, 4', an interior face 52, 52' oriented toward the interior space I and thus corresponding to the interior face 22, 22' of the glass pane 2, 2', and an edge surface 51, 51' located between these two faces.

Each plastic material interlayer 4, 4' has an exterior interlayer face 40, 40' that is oriented toward the interlayer face 32, 32' and that herein makes contact with this interlayer face 32, 32', an interior interlayer face 42, 42' that is oriented toward the interlayer face 50, 50' and that herein makes contact with this interlayer face 50, 50', as well as an edge surface 41, 41' that is located between these two interlayer faces 40, 42 and 40', 42'.

The glazed unit is a laminated glazed unit in the sense that there is no gaseous space or empty space between the sheets that constitute it in the exterior-interior transverse direction.

Each glass pane 2, 2' thus has an exterior face formed by the exterior face 30, 30' of the exterior glass sheet 3, 3', an interior face formed by the interior face 52, 52' of the interior glass sheet 5, 5' and an edge surface located between these two faces, corresponding to the edge surface 31, 31' of the exterior glass sheet 3, 3' and to the edge surface 51, 51' of the interior glass sheet 5, 5', these two edge surfaces (on the one hand 31, 51 and on the other hand 31', 51') being here continuous with one another whilst being separated by a gap corresponding to the thickness of the plastic material layer 4, 4'.

The edge surface 41' of the interlayer 4' of the laminated second glass pane 2' is preferably set back relative to the edge surface 31' of the exterior glass sheet 3' of the second glass pane 2'; the edge surface 41 of the interlayer 4 of the laminated first glass pane 2 is, preferably, set back relative to the edge surface 31 of the exterior glass sheet 3 of the first glass pane 2. This setback of the edge surface 41, 41' of the interlayer 4, 4' relative to the edge surface 31, 31' of the exterior glass sheet 3, 3' is preferably at least 1.0 mm; it may be between 1.0 mm and 20.0 mm, or even between 2.0 and 5.0 mm.

The adjacent glass pane 2' preferably has a thickness identical to the glass pane 2 in order to facilitate the positioning of one relative to the other during the assembly and the manufacture of the glazed unit 1.

The glazed unit 1 further includes a seal 6. The seal 6 is made of plastic and is produced after the manufacture of the glass panes 2, 2' so as to obtain their assembly in a contiguous manner to form the glazed unit 1. The material of the seal 6 may be a hot-melt adhesive, polyvinyl butyral, also known under the acronym PVB, ethylene vinyl acetate, also known under the acronym EVA, or polyurethane, also known under the acronym PU. The seal 6 has an exterior face 61, oriented toward the exterior space E, and an interior face 62, oriented toward the interior space I. The exterior face 61 is substantially flush with the exterior face 20 of the glass pane 2 and with the exterior face 20' of the glass pane 2'. Thus, the exterior face 61 is substantially continuous with the exterior faces 20, 20' of two glass panes 2, 2'. The exterior face 61 does not extend farther toward the exterior than the exterior faces 20, 20' of the two glass panes 2, 2'. This configuration is also called "flush." The gap between the exterior face 61 and the exterior faces 20, 20' of two glass panes 2, 2' is between 0 and 0.5 mm. Furthermore, the interior face 62 is substantially flush with the interior face 22 of the glass pane 2 and with the interior face 22' of the glass pane 2'. Thus, the interior face 62 is substantially continuous with the interior faces 22, 22' of two glass panes 2, 2'. The interior face 62 does not protrude farther toward the interior than the interior faces 22, 22' of the two glass panes 2, 2'. The gap between the interior face 62 and the interior faces 22, 22' of two glass panes 2, 2' is between 0 and 0.5 mm.

The glazed unit 1 according to the invention has the advantage of having a junction that is more discrete than the glazed units of the prior art. The aesthetics are consequently improved.

Furthermore, the assembly of two glass panes 2, 2' is simple to implement. It is also possible to form a glazed unit 1 having relatively complex shapes. In the first embodiment of the invention, the glazed unit 1 includes two glass panes 2, 2', but the invention may be applied to a number of glass panes greater than two.

As explained herein below, the seal may comprise an insert and this insert may be made of a metallic or plastic material, preferably reinforced by fibers and in particular glass or carbon fibers. However, the seal may also be made of a single material between its exterior face and its interior face; this material may be multi-component in the sense that its chemical analysis can reveal the presence of several chemical components; however, the material analysis of the seal leads to considering that it is made of a single material.

The seal may be made of translucent material, or even transparent material.

As further outlined hereinafter, the glazed unit may comprise at least one adhesion means arranged between a face of the insert and interlayer faces of the interior glass panes and/or the interior faces of interior glass panes. This adhesion means may comprise a double-sided adhesive or a polymer such as polyurethane.

Owing to the setback of the edge surface 41' of the interlayer 4' of the laminated second glass pane 2', the seal 6 is in contact with the interior face 32' of the exterior glass sheet 3' of the second glass pane 2'; the seal 6 thus penetrates into the volume created owing to the setback, and the mechanical strength of the seal, and thus of the glazed unit, is reinforced.

Furthermore, the edge surface 41' of the interlayer 4' of the laminated second glass pane 2' is preferably set back relative to the edge surface 51' of the interior glass sheet 5' of the second glass pane 2'; thus, the seal 6 is in contact with the interlayer face 50' of the interior glass sheet 5' of the second glass pane 2', and the mechanical strength of the seal, and thus of the glazed unit, is reinforced.

Owing to the setback of the edge surface 41 of the interlayer 4 of the laminated first glass pane 2, the seal 6 is in contact with the interior face 32 of the exterior glass sheet 3 of the second glass pane 2; the seal 6 thus penetrates into the volume created owing to the setback, and the mechanical strength of the seal, and thus of the glazed unit, is reinforced.

Furthermore, the edge surface 41 of the interlayer 4 of the laminated first glass pane 2 is preferably set back relative to the edge surface 51 of the interior glass sheet 5 of the first glass pane 2; thus, the seal 6 is in contact with the interlayer face 50 of the interior glass sheet 5 of the first glass pane 2 and the mechanical strength of the seal, and thus of the glazed unit, is reinforced.

The setback of the edge surface 41, 41' from the interlayer 4, 4' relative to the edge surface 51, 51' of the interior glass sheet 5, 5' is preferably at least 1.0 mm; it may be between 1.0 mm and 20.0 mm, or even between 2.0 and 5.0 mm. In a particular configuration, the setback of the edge surface 41, 41' of the interlayer 4, 4' relative to the edge surface 31, 31' is identical to the setback of the edge surface 41, 41' of the interlayer 4, 4' relative to the edge surface 51, 51' of the interior glass sheet 5, 5'.

With reference to FIG. 2, a glazed unit 201 comprising a first glass pane 202 and a second glass pane 202' is schematically shown, according to a second embodiment of the present invention. The first glass pane 202 is a monolithic glass sheet including an exterior face 220 oriented toward the exterior space E, an interior face 222 oriented toward the interior space I and a peripheral edge surface 221 located between these two faces. The second glass pane 202' is a laminated glass pane including an exterior face 220' oriented toward the exterior space E, an interior face 222' oriented toward the interior space I and a peripheral edge surface 221' located between these two faces. The second glass pane 202' is a laminated glass pane and includes, from the exterior toward the interior, at least: an exterior glass sheet 203', a plastic material interlayer 204' and an interior glass sheet 205'; however, it is possible for at least one other layer to be interleaved between the exterior glass sheet 203' and the plastic material interlayer 204' or between the plastic material interlayer 204' and the interior glass sheet 205'. Straight edge surfaces 221, 221' are shown. Alternatively, the edge surfaces 221, 221' are rounded. The exterior glass sheet 203' has an exterior face 230' oriented toward the exterior space E and thus corresponding to the exterior face 220' of the glass pane 202', an interlayer face 232' oriented toward the plastic material interlayer 204', and an edge surface 231' located between these two faces.

The interior glass sheet 205' has an interlayer face 250' which is oriented toward the plastic material interlayer 204', an interior face 252' which is oriented toward the interior space I and thus corresponding to the interior face 222' of the glass pane 202', and an edge surface 251' located between these two faces.

The plastic material interlayer 204' has an exterior interlayer face 240' that is oriented toward the interlayer face 232' and that herein is in contact with this interlayer face 232', an interior interlayer face 242' that is oriented toward the interlayer face 250' and that herein is in contact with this interlayer face 250', as well as a peripheral edge 241' that is located between these two interlayer faces 240', 242'.

A glass pane is said to be "laminated" in the sense that there is no gaseous space or empty space between the at least three sheets that constitute it in the exterior-interior transverse direction.

The glass pane 202' thus has an exterior face formed by the exterior face 230' of the exterior glass sheet 203', an interior face formed by the interior face 252' of the interior glass sheet 205' and an edge surface located between these two faces, corresponding to the edge surface 231' of the exterior glass sheet 203' and to the edge surface 251' of the interior glass sheet 205', these two edge surfaces being here continuous with one another whilst being separated by a gap corresponding to the thickness of the plastic material layer 204'.

The glazed unit 201 further includes a seal 206. The seal 206 is made of plastic and is produced after the manufacture of the glass panes 202, 202' so as to obtain their assembly in a contiguous manner to form the glazed unit 201. The material of the seal 206 may be a hot-melt adhesive, polyvinyl butyral, also known under the acronym PVB, ethylene vinyl acetate, also known under the acronym EVA, or polyurethane, also known under the acronym PU. The seal 206 has an exterior face 261, oriented toward the exterior space E, and an interior face 262, oriented toward the interior space I. The exterior face 261 is substantially flush with the exterior face 220 of the glass pane 202 and with the exterior face 220' of the glass pane 202'. Thus, the exterior face 261 is substantially continuous with the exterior faces 220, 220' of two glass panes 202, 202'. The exterior face 261 does not extend farther toward the exterior than the exterior faces 220, 220' of the two glass panes 202, 202'. The gap between the exterior face 261 and the exterior faces 220, 220' of two glass panes 202, 202' is between 0 and 0.5 mm.

The interior face 262 of the seal 206 has an inclination such that it is substantially continuous with the interior faces 222, 222' of two glass panes 202, 202'. The seal 206, due to the inclination of the interior face 262, allows connection of the interior face 222 of the first glass pane 202 and the interior face 222' of the second glass pane 202'. Although the thicknesses of the first and second glass panes 202, 202' are different, the seal 206 has the advantage of ensuring continuity between their respective interior faces 222, 222'. The advantage of the glazed unit 201 is to have a more aesthetic junction between a monolithic glass pane and a laminated glass pane.

In this FIG. 2, as only the second glass pane 202' is laminated, only the edge surface 241' of the interlayer is set back relative to the edge surface 231' of the exterior glass sheet 3' of the second glass pane 202'; this edge surface 241' of the interlayer is preferably further set back relative to the edge surface 251' of the interior glass sheet; the seal 206 thus penetrates into the volume created owing to the setback, and the mechanical strength of the seal, and thus of the glazed unit, is reinforced.

In a particular configuration, the setback of the edge surface 41' of the interlayer 4' relative to the edge surface 31' is identical to the setback of the edge surface 41' of the interlayer 4' relative to the edge surface 51' of the interior glass sheet 5'.

With reference to FIG. 3, a glazed unit 301 according to a third embodiment of the present invention is schematically shown. This third embodiment is an alternative to the first embodiment of the invention. Consequently, in order to avoid redundant description, elements and references shared with the first embodiment are not described again in the description of this third embodiment. Thus, the glazed unit 301 further includes, relative to the glazed unit 1 described above, an insert 368. The insert 368 is T-shaped, in a cross sectional view, and comprises a central part 369, a first wing 370 and a second wing 371. The central part 369 has a parallelepipedal shape and has an axis A-A' oriented perpendicular to the axis X-X'. Preferably, the axis A-A' is arranged substantially in the middle of the seal 6. In one alternative, the insert 368 has a curved shape. The first and second wings 370, 371 also have a parallelepipedal shape and further have an axis B-B' oriented perpendicular to the axis A-A'. The insert 368 is, for example, made of a metallic material, such as aluminum, stainless steel, or a plastic material, such as polyethylene, optionally reinforced with carbon or glass fibers. The insert 368 allows increased rigidity and resistance of the seal 6.

Referring to FIG. 4, a glazed unit 401 comprising a first glass pane 402 and a second glass pane 402' is schematically shown, according to a fourth embodiment of the present invention. Each glass pane 402, 402' is laminated and has an exterior face 420, 420' oriented toward the exterior space E, an interior face 422, 422' oriented toward the interior space I. Each of the two glass panes 402, 402' of the glazed unit 401 is preferentially a laminated glass pane which includes, from the exterior to the interior, at least: an exterior glass sheet 403, 403', a plastic material interlayer 404, 404' and an interior glass sheet 405, 405'; however, it is possible that at least one other sheet is inserted between the exterior glass sheet 403, 403' and the plastic material interlayer 404, 404' or between the plastic material interlayer 404, 404' and the interior glass sheet 405, 405'. Each exterior glass sheet 403, 403' has an exterior face 430, 430' oriented toward the exterior space E and thus corresponding to the exterior face 420, 420' of the glass pane 402, 402', an interlayer face 432, 432' oriented toward the plastic material interlayer 404, 404', and an edge surface 431, 431' located between these two faces.

Each interior glass sheet 405, 405' has an interlayer face 450, 450' oriented toward the plastic material interlayer 404, 404', an interior face 452, 452' which is oriented toward the interior space I and thus corresponding to the interior face 422, 422' of the glass pane 402, 402', and an edge surface 451, 451' located between these two faces.

Each plastic material interlayer 404, 404' has an exterior interlayer face 440, 440' that is oriented toward the interlayer face 432, 432' and that herein is in contact with this interlayer face 432, 432', an interior interlayer face 442, 442' that is oriented toward the interlayer face 450, 450' and that herein is in contact with this interlayer face 450, 450', as well as a edge surface 441, 441' that is located between these two interlayer faces 440, 442 and 440', 442'.

Each glass pane 402, 402' thus has an exterior face formed by the exterior face 430, 430' of the exterior glass sheet 403, 403', an interior face formed by the interior face 452, 452' of the interior glass sheet 405, 405' and an edge surface located between these two faces, corresponding to the edge surface 431, 431' of the exterior glass sheet 403, 403' and to the edge surface 451, 451' of the interior glass sheet 405, 405', these two edge surfaces (on the one hand 431, 451 and on the other hand 431', 451') being here continuous with one another whilst being separated by a gap corresponding to the thickness of the plastic material layer 404, 404'.

The glazed unit 401 further includes a seal 406 having the same features as those described in the first embodiment of the invention. The seal 406 has an exterior face 461, oriented toward the exterior space E, and an interior face 462, oriented toward the interior space I. The exterior face 461 is substantially flush with the exterior face 420 of the glass pane 402 and with the exterior face 420' of the glass pane 402'. Thus, the exterior face 461 is substantially continuous with the exterior faces 420, 420' of two glass panes 402, 402'. The exterior face 461 does not extend farther toward the exterior than the exterior faces 420, 420' of the two glass panes 402, 402'. The gap between the exterior face 461 and the exterior faces 420, 420' of two glass panes 402, 402' is between 0 and 0.5 mm. Furthermore, the interior face 462 is substantially flush with the interior face 422 of the glass pane 402 and with the interior face 422' of the glass pane 402'. Thus, the interior face 462 is substantially continuous with the interior faces 422, 422' of two glass panes 402, 402'. The interior face 462 does not protrude farther toward the interior than the interior faces 422, 422' of the two glass panes 402, 402'. The gap between the interior face 462 and the interior faces 422, 422' of two glass panes 402, 402' is between 0 and 0.5 mm.

The edge surfaces 441, 451 of the interlayer 404 and of the interior glass sheet 405 of the first glass pane 402 are set back relative to the edge surface 431 of the exterior glass sheet 403 of the first glass pane 402. The edge surfaces 441', 451' of the interlayer 404' and of the interior glass sheet 405' of the second glass pane 402' are set back relative to the edge surface 431' of the exterior glass sheet 403' of the second glass pane 402'.

The setback on the one hand of the edge surface 441, 451 and on the other hand of the edge surfaces 441', 451' are preferably each between 5.0 and 20.0 mm, for example 10.0 mm.

These setbacks allow the seal 406 to be in contact with the interior faces 432, 432' of the exterior glass sheets 403, 403'. The seal 406 further includes an insert 468 having a parallelepipedal shape. Preferably, the thickness of the insert 468 is between 0.3 times and 1 times the thickness of the interior glass sheets 405, 405'. The insert 468 has an exterior face 469 and an interior face 470. The seal 406 further includes a first layer of adhesive 471 arranged between the exterior face 469 of the insert 468 and the interior face 432 of the exterior glass sheet 403 of the first glass pane 402. The seal 406 further includes a second layer of adhesive 471' arranged between the exterior face 469 of the insert 468 and the interior face 432' of the exterior glass sheet 403' of the second glass pane 402'. For example, the layer of adhesive comprises polyurethane (PU). This configuration allows reinforced rigidity and mechanical strength of the seal 406.

FIG. 8 also shows that it is possible to provide for the insert 468 to comprise a mechanical connection system to allow the attachment and disassembly of an accessory such as a finishing part, a trim, a spoiler, or such as an electronic part such as a signaling lamp or a vehicle guidance system part (for example, LIDAR).

Furthermore, FIG. 9 illustrates that it is possible to provide for the glazed unit according to the invention to include a single bead of adhesive 100 under the interior face 62 of the seal 6, 206, 406, 606, 706. This allows a gain in dimensions of an interior crosspiece and consequently a reduction in the weight of the vehicle equipped with the glazed unit.

Furthermore, with a single bead of adhesive 100, it is then possible to pass one or more electrical connectors 110, 110' from the interior space toward the glazed unit on either side of the single bead of adhesive 100 without having to pass through it, and therefore, without risk of degrading its qualities.

FIG. 5 shows a fifth embodiment of the invention representing an alternative to the fourth embodiment. Consequently, in order to avoid redundant description, elements and references shared with the fourth embodiment are not described again in the description of this fifth embodiment. Thus, the glazed unit 501 includes a first double-sided adhesive 571 arranged between the exterior face 469 of the insert 468 and the interior face 432 of the exterior glass sheet 403 of the first glass pane 402, which is ultimately located inside the seal 406. The glazed unit 501 also includes a second double-sided adhesive 571' arranged between the exterior face 469 of the insert 468 and the interior face 432' of the exterior glass sheet 403' of the second glass pane 402', which is also ultimately inside the seal 406. For example, the double-sided adhesive employed includes an acrylic-coated polyethylene support; this may also be, for example, a layer of polyurethane-based adhesive. This configuration allows reinforced rigidity and mechanical strength of the seal 406.

Referring now to FIG. 6, a glazed unit 606 according to a sixth embodiment of the invention is schematically shown. The glazed unit 606 comprises a first glass pane 602 and a second glass pane 602'. The first glass pane 602 is a monolithic glass sheet including an exterior face 620 oriented toward the exterior space E, an interior face 622 oriented toward the interior space I and a peripheral edge surface 621 located between these two faces. The second glass pane 602' is a laminated glass pane including an exterior face 620' oriented toward the exterior space E, an interior face 622' oriented toward the interior space I. The second glass pane 602' includes, from the exterior toward the interior, at least: an exterior glass sheet 603', a plastic material interlayer 604' and an interior glass sheet 605'; however, it is possible for at least one other layer to be interleaved between the exterior glass sheet 603' and the plastic material interlayer 604' or between the plastic material interlayer 604' and the interior glass sheet 605'. A straight edge 621 is shown. Alternatively, the edge 221 is rounded. The exterior glass sheet 603' has an exterior face 630' oriented toward the exterior space E and thus corresponding to the exterior face 620' of the glass pane 602', an interlayer face 632' oriented toward the plastic material interlayer 604', and an edge surface 631' located between these two faces. This configuration of FIG. 6 is particularly suitable for a connection between a laminated glass pane and a monolithic glass pane made of plastic or thermally tempered glass.

The interior glass sheet 605' has an interlayer face 650' which is oriented toward the plastic material interlayer 604', an interior face 652' which is oriented toward the interior space I and thus corresponding to the interior face 622' of the glass pane 602', and an edge surface 651' located between these two faces.

The plastic material interlayer 604' has an exterior interlayer face 640' that is oriented toward the interlayer face 632' and that herein is in contact with this interlayer face 632', an interior interlayer face 642' that is oriented toward the interlayer face 650' and that herein makes contact with this interlayer face 650', as well as a peripheral edge 641' that is located between these two interlayer faces 640', 642'.

The glass pane 602' thus has an exterior face formed by the exterior face 630' of the exterior glass sheet 603', an interior face formed by the interior face 652' of the interior glass sheet 605' and an edge surface located between these two faces, corresponding to the edge surface 631' of the exterior glass sheet 603' and to the edge surface 651' of the interior glass sheet 605', these two edge surfaces being here continuous with one another whilst being separated by a gap corresponding to the thickness of the plastic material layer 604'.

The glazed unit 601 further includes a seal 606 having the features described in the second embodiment. Thus, these features are not described again for the description of this sixth embodiment. The edge surfaces 641', 651' of the interlayer 604' and of the interior glass sheet 605' of the second glass pane 602' are set back relative to the edge surface 631' of the exterior glass sheet 603' of the second glass pane 602'. These setbacks allow the seal 606 to be in contact with the interior face 632' of the exterior glass sheet 603'. The interior face 662 of the seal 606 has an inclination and includes an insert 668 having the features of the insert described in the fifth embodiment. Thus, the glazed unit 601 includes a first double-sided adhesive 671 arranged between the exterior face 669 of the insert 668 and the interior face 622 of the first glass pane 602, which is ultimately located inside the seal 406. The glazed unit 601 also includes a second double-sided adhesive 671' arranged between the exterior face 669 of the insert 668 and the interior face 632' of the exterior glass sheet 603' of the second glass pane 602', which is also ultimately inside the seal 406.

Referring now to FIG. 7, a glazed unit 701 according to a seventh embodiment of the invention is schematically shown. The glazed unit 701 comprises a first glass pane 702 and a second glass pane 702'. The first glass pane 702 is a monolithic glass sheet including an exterior face 720 oriented toward the exterior space E, an interior face 722 oriented toward the interior space I and a peripheral edge surface 721 located between these two faces. The second glass pane 702' is a laminated glass pane including an exterior face 720' oriented toward the exterior space E, an interior face 722' oriented toward the interior space I and a peripheral edge surface 721' located between these two faces. The second glass pane 702' includes, from the exterior toward the interior, at least: an exterior glass sheet 703', a plastic material interlayer 704' and an interior glass sheet 705'; however, it is possible for at least one other layer to be interleaved between the exterior glass sheet 703' and the plastic material interlayer 704' or between the plastic material interlayer 704' and the interior glass sheet 705'. Straight edge surfaces 721, 721' are shown. Alternatively, the edge surfaces 721, 721' are rounded. The exterior glass sheet 703' has an exterior face 730' oriented toward the exterior space E and thus corresponding to the exterior face 720' of the glass pane 702', an interlayer face 732' oriented toward the plastic material interlayer 704', and an edge surface 731' located between these two faces. This configuration of FIG. 7 is particularly suitable for a connection between a laminated glass pane and a monolithic glass pane made of plastic or thermally tempered glass which includes an encapsulated seal.

The interior glass sheet 705' has an interlayer face 750' that is oriented toward the plastic material interlayer 704', an interior face 752' oriented toward the interior space I and thus corresponding to the interior face 722' of the glass pane 702', and an edge surface 751' located between these two faces.

The plastic material interlayer 704' has an exterior interlayer face 740' that is oriented toward the interlayer face 732' and that herein is in contact with this interlayer face 732', an interior interlayer face 742' that is oriented toward the interlayer face 750' and that herein is in contact with this interlayer face 750', as well as a peripheral edge 741' that is located between these two interlayer faces 740', 742'.

The glass pane 702' thus has an exterior face formed by the exterior face 730' of the exterior glass sheet 703', an interior face formed by the interior face 752' of the interior glass sheet 705' and an edge surface located between these two faces, corresponding to the edge surface 731' of the exterior glass sheet 703' and to the edge surface 751' of the interior glass sheet 705', these two edge surfaces being here continuous with one another whilst being separated by a gap corresponding to the thickness of the plastic material sheet 704'.

The glazed unit 701 further includes a seal 706 having the features described in the second embodiment. Thus, these features are not described again. The seal 706 has an exterior face 761, an interior face 762 and includes an insert 768. The glazed unit 701 further comprises an encapsulated seal 780 in contact with the first glass pane 702. The encapsulated seal 780 is arranged on the perimeter of the first glass pane 702 and makes it possible to ensure sealing, with, for example, the body of the vehicle. The insert 768 is both integrated into the seal 706 and the encapsulated seal 780. The encapsulated seal 780 has an exterior face 781 and an interior face 782. The exterior face 761 of the seal 706 is substantially flush with the exterior face 720 of the glass pane 702, with the exterior face 720' of the glass pane 702' and with the exterior face 781 of the encapsulated seal 780. Thus, the exterior face 761 is substantially continuous with the exterior faces 720, 720' of two glass panes 702, 702' and the exterior face 781 of the encapsulated seal 780. The interior face 762 of the seal 706 is continuous with the interior face 782 of the encapsulated seal 780 and the interior face 722' of the interior glass sheet 705'.

The invention claimed is:

1. A glazed unit for means of transport, the glazed unit comprising a first glass pane and a second glass pane that are contiguous, the second glass pane being laminated and includes an exterior glass sheet, an interior glass sheet and a plastic material interlayer arranged between said exterior glass sheet and said interior glass sheet, said glazed unit having an exterior face and an interior face, wherein an edge surface of the plastic material interlayer of said second glass pane is set back relative to an edge surface of the exterior glass sheet of said second glass pane and said glazed unit includes a seal that is arranged between said first glass pane and said second glass pane, said seal having an exterior face and an interior face, the exterior face of said glazed unit and the exterior face of said seal being flush and said seal being in contact with an interior face of the exterior glass sheet of said second glass pane.

2. The glazed unit according to claim 1, wherein the interior face of said glazed unit and the interior face of said seal are flush.

3. The glazed unit according to claim 1, wherein said seal includes an insert.

4. The glazed unit according to claim 3, wherein said insert is made of a metallic or plastic material.

5. The glazed unit according to claim 3, wherein said insert is T-shaped.

6. The glazed unit according to claim 1, wherein said first glass pane is laminated and includes an exterior glass sheet, an interior glass sheet and a plastic material interlayer arranged between said exterior glass sheet and said interior glass sheet, said seal being in contact with an interior face of the exterior glass sheet of said first glass pane.

7. The glazed unit according to claim 1, further comprising a single bead of adhesive under the interior face of said seal.

8. The glazed unit according to claim 3, wherein said insert having a face arranged facing an interlayer face of the exterior glass sheet of said laminated second glass pane.

9. The glazed unit according to claim 8, wherein said glazed unit includes at least one adhesion means arranged between said face of said insert and said interlayer faces.

10. The glazed unit according to claim 9, wherein said adhesion means includes a double-sided adhesive or a polymer.

11. The glazed unit according to claim 3, wherein said first glass pane is monolithic and has an interior face and said exterior glass sheet of said second glass pane has an interlayer face, said insert having a face arranged facing said interior face of the first glass pane and said interlayer face of said second glass pane.

12. The glazed unit according to claim 3, wherein said first glass pane is monolithic and includes a seal comprising said insert.

13. The glazed unit according to claim 1, wherein the means of transport is a vehicle.

14. The glazed unit according to claim 4, wherein the plastic material is reinforced by fibers.

15. The glazed unit according to claim 14, wherein the fibers are glass or carbon fibers.

16. The glazed unit according to claim 8, wherein said insert has a face arranged facing an interlayer face of the exterior glass sheet of said laminated first glass pane.

17. The glazed unit according to claim 10, wherein the polymer is a polyurethane.

* * * * *